(12) United States Patent
Lienert et al.

(10) Patent No.: US 11,471,946 B2
(45) Date of Patent: Oct. 18, 2022

(54) ADDITIVE MANUFACTURING OF FERRITIC/MARTENSITIC STEEL WITH IMPROVED HIGH TEMPERATURE STRENGTH

(71) Applicant: Triad National Security, LLC, Los Alamos, NM (US)

(72) Inventors: Thomas J. Lienert, Los Alamos, NM (US); Stuart Andrew Maloy, Los Alamos, NM (US); Benjamin P. Eftink, Los Alamos, NM (US); Daniel Vega, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 109 days.

(21) Appl. No.: 16/563,278

(22) Filed: Sep. 6, 2019

(65) Prior Publication Data

US 2020/0078865 A1 Mar. 12, 2020

Related U.S. Application Data

(60) Provisional application No. 62/727,776, filed on Sep. 6, 2018.

(51) Int. Cl.
| | |
|---|---|
| *B22F 3/105* | (2006.01) |
| *C22F 1/00* | (2006.01) |
| *B22F 12/00* | (2021.01) |
| *B33Y 80/00* | (2015.01) |
| *B33Y 70/00* | (2020.01) |
| *B33Y 10/00* | (2015.01) |

(Continued)

(52) U.S. Cl.
CPC ............. *B22F 12/00* (2021.01); *B33Y 80/00* (2014.12); *C22F 1/00* (2013.01); *B22F 10/10* (2021.01); *B22F 2301/35* (2013.01); *B33Y 10/00* (2014.12); *B33Y 30/00* (2014.12); *B33Y 70/00* (2014.12); *C21D 2211/008* (2013.01)

(58) Field of Classification Search
None
See application file for complete search history.

(56) References Cited

U.S. PATENT DOCUMENTS

2012/0031530 A1* 2/2012 Takabe ................ C21D 8/0205
148/506

FOREIGN PATENT DOCUMENTS

JP 2012172159 A * 9/2012

OTHER PUBLICATIONS

Nerea Ordas et al. "Fabrication of TBMs cooling structures demonstrators using additive manufacturing (AM) technology and HIP" Fusion Engineering and Design, 2015, 96-97, pp. 142-148.

(Continued)

*Primary Examiner* — Anthony M Liang

(57) ABSTRACT

Techniques for using additive manufacturing (AM) to fabricate creep resistant ferritic/martensitic steel with improved high temperature strength are described. AM processing may be performed on Grade 91 steel powder. Beam powers from about 221 W to about 270 W may be used. Traverse rates from about 675 mm/s to about 825 mm/s may be used. Heat inputs ranging from about 55.7 J/mm³ to about 83.2 J/mm³ may be produced. Creep resistant ferritic/martensitic steel, produced according to the present disclosure, has improved strain yield strength and ductility as compared to wrought steel.

15 Claims, 5 Drawing Sheets

(51) Int. Cl.
    *B33Y 30/00*      (2015.01)
    *B22F 10/10*      (2021.01)

(56)      References Cited

OTHER PUBLICATIONS

TWI Ltd "What is powder bed fusion? Process definition and advantages" https://www.twi-global.com/technical-knowledge/faqs/what-is-powder-bed-fusion (11 pages).

* cited by examiner

ADDITIVE MANUFACTURING OF FERRITIC/MARTENSITIC STEEL WITH IMPROVED HIGH TEMPERATURE STRENGTH

FEDERALLY SPONSORED RESEARCH OR DEVELOPMENT

The United States government has rights in this invention pursuant to Contract No. 89233218CNA000001 between the United States Department of Energy (DOE), the National Nuclear Security Administration (NNSA), and Triad National Security, LLC for the operation of Los Alamos National Laboratory.

BACKGROUND

Wrought iron is a form of iron obtained by smelting. Wrought iron is a soft, ductile, fibrous variety that is produced from a semi-fused mass of relatively pure iron globules partially surrounded by slag. Wrought iron usually contains less than 0.1 percent carbon and 1 or 2 percent slag. Wrought iron is superior for most purposes to cast iron, which is overly hard and brittle owing to its high carbon content.

Originally, iron was smelted directly from iron ore by heating the latter in a forge with charcoal, which served both as a fuel and a reducing agent. While still hot, the reduced iron and slag mixture was then removed as a lump and worked (wrought) with a hammer to expel most of the slag and weld the iron into a coherent mass. Some techniques produce wrought iron indirectly from cast iron made in a blast furnace. For example, cast iron may be melted in a hollowed hearth and then agitated with a bar so that the carbon in the cast metal is removed by oxidizing gases of the furnace. As the carbon is removed, the proportion of solid decarbonized iron progressively increases, and the resulting thick mixture of metal and slag is then run through a squeezer, which removes much of the excess slag and forms a rough cylinder for subsequent rolling into a more finished product.

Baseline mechanical properties of ferritic/martensitic steels produced by typical wrought processing techniques show a significant reduction in yield strength at high temperatures.

SUMMARY

Teachings of the present disclosure relate to additive manufacturing (AM) that directly addresses, among other things, the objective of improved high temperature mechanical properties of a ferritic/martensitic steel. For example, results on a ferritic/martensitic steel (e.g., Grade 91) produced by AM may show a yield stress of over 600 MPa at about 600° C. In at least some examples, homogenous steel powder may undergo AM processing to produce heterogeneous ferritic/martensitic steel having increased tensile and ductility properties as compared to the underlying homogenous steel powder. Teachings of the present disclosure control microstructures through process manipulation with a view toward optimizing properties and performance in service.

An aspect of the present disclosure relates to a method comprising obtaining a steel powder, and performing powder bed fusion (PBF) additive manufacturing (AM) using the steel powder to produce a creep resistant ferritic/martensitic steel. In at least some examples, the steel powder comprises Grade 91 (Gr91) steel powder. In at least some examples, the steel powder comprises Grade 92 (Gr92) steel powder. In at least some examples, the performing comprises using a beam power between about 221 W and about 270 W. In at least some examples, the performing comprises using a traverse rate between about 675 mm/s and about 825 mm/s. In at least some examples, the performing comprises producing a heat input between about 55.7 J/mm$^3$ and about 83.2 J/mm$^3$. In at least some examples, the performing comprises a heat input value of about 68.1 J/mm$^3$. In at least some examples, the performing comprises rotating a direction of deposition. In at least some examples, directions of deposition of adjacent layers of the steel powder are rotated about 67°.

Another aspect of the present disclosure relates to a creep resistant ferritic/martensitic steel produced from powder bed fusion (PBF) additive manufacturing (AM) of creep resistant ferritic/martensitic steel powder. The creep resistant ferritic/martensitic steel comprises improved strain yield strength as compared to wrought steel, and improved ductility as compared to wrought steel. In at least some examples, the creep resistant ferritic/martensitic steel is produced from PBF AM of Grade 91 (Gr91) steel powder. In at least some examples, the creep resistant ferritic/martensitic steel is produced from PBF AM of Grade 92 (Gr92) steel powder. In at least some examples, the creep resistant ferritic/martensitic steel has a strain yield strength of 835 MPa at room temperature. In at least some examples, the creep resistant ferritic/martensitic steel has a strain yield strength of 700 MPa at 600° C. In at least some examples, the creep resistant ferritic/martensitic steel is annealed for about 20 hours at 600° C., and the annealed creep resistant ferritic/martensitic steel has a strain yield strength of 870 MPa at room temperature. In at least some examples, the creep resistant ferritic/martensitic steel is annealed for about 20 hours at 600° C., and the annealed creep resistant ferritic/martensitic steel has a strain yield strength of 680 MPa at 600° C. In at least some examples, the creep resistant ferritic/martensitic steel has a ductility of 0.09 at room temperature. In at least some examples, the creep resistant ferritic/martensitic steel has a ductility of 0.05 at 600° C. In at least some examples, the creep resistant ferritic/martensitic steel is annealed for about 20 hours at 600° C., and the annealed creep resistant ferritic/martensitic steel has a ductility of 0.08 at room temperature. In at least some examples, the creep resistant ferritic/martensitic steel is annealed for about 20 hours at 600° C., and the annealed creep resistant ferritic/martensitic steel has a ductility of 0.03 at 600° C.

BRIEF DESCRIPTION OF DRAWINGS

For a more complete understanding of the present disclosure, reference is now made to the following description taken in conjunction with the accompanying drawings.

DETAILED DESCRIPTION

Additive Manufacturing (AM)

Figure 1:
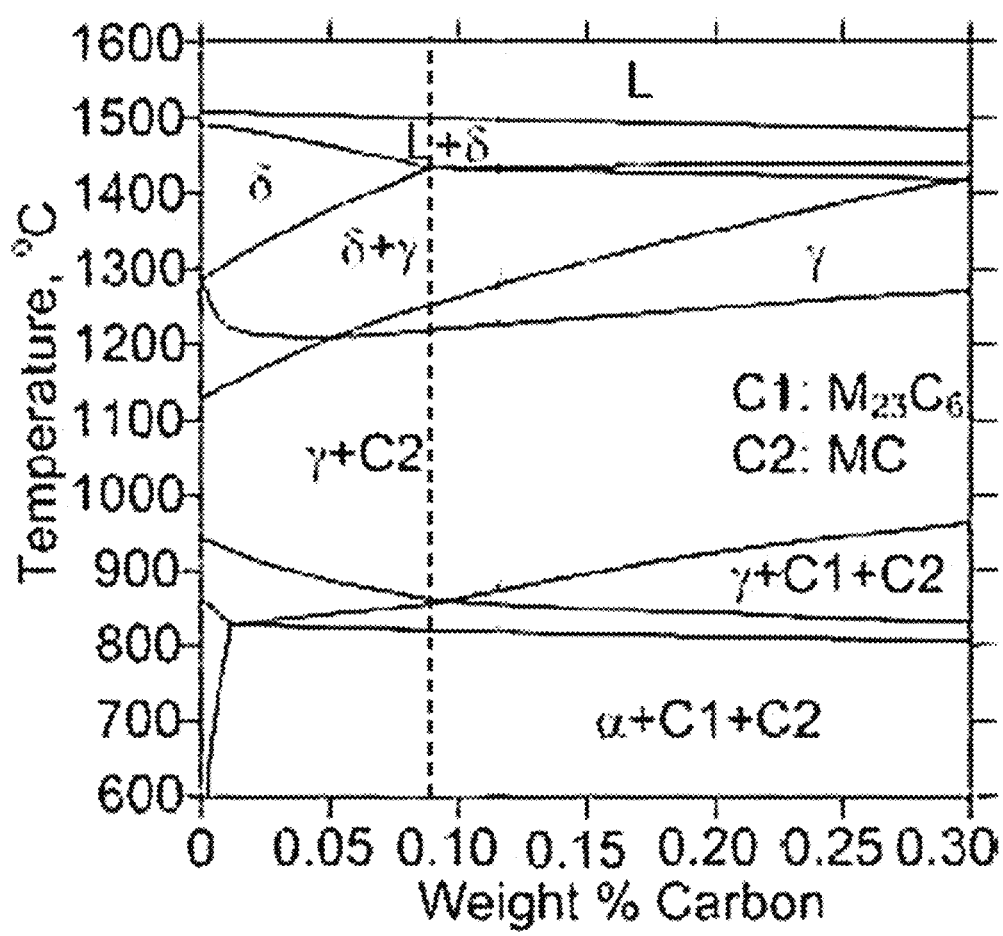
FIG. 1 is a calculated pseudo-binary phase diagram for Grade 91 (Gr91) steel according to embodiments of the present disclosure.

Teachings of the present disclosure relate to an AM-based solution for precision fabrication of components out of ferritic/martensitic alloys with significantly improved high temperature strength while also exhibiting work hardening and ductility.

AM, commonly known as three-dimensional (3D) printing, is a manufacturing method in which parts are formed from powder, wire, or sheets in a process that proceeds layer by layer. Various types of AM systems and processes exist.

One type of AM process is powder-bed fusion (PBF). PBF involves focused energy (e.g., a laser beam) that is used to melt or sinter a layer of a powder bed. Re-melting of previous layers during the melting of the current layer allows for adherence of the current layer to the rest of the part. Two types of AM processes that use PBF principles are electron beam melting (EBM) and selective laser melting (SLM).

PBF processes (including both EBM and SLM) involve certain steps: machine set-up, operation, powder recovery, and substrate removal. A PBF machine requires a build substrate, or "start plate," to give mechanical and thermal support to the build material. SLM processes bolt or clamp down the substrate, whereas EBM processes typically sinter powder surrounding the plate to provide stability. This prevents the plate from becoming displaced by the rake blade of an EBM system. When successive layers of powder are distributed (rolled or raked out), existing layers of the build must not move; the substrate helps provide mechanical support. The substrate also provides a thermal path to dissipate heat.

After the build is complete, excess powder is removed from the build chamber. For EBM systems, this powder is passed through a powder recovery system to remove and recover sintered powder from around the parts. For SLM systems, powder surrounding the parts does not sinter as much and can be sifted directly to remove sintered clusters. Depending on the PBF process material, the build substrate may adhere to the parts. The substrate may be cut off, for example with abrasive saws and wire EDM.

Although EBM and SLM processes use the same PBF principle, there are certain differences in their hardware set-up. An EBM system includes a filament, magnetic coils to collimate and deflect the beam spatially, and an electron beam column. SLM typically includes a system of lenses and a scanning mirror (or galvanometer) to manoeuver the position of a beam.

EBM and SLM processes also handle powder distribution differently. SLM systems typically use a powder feeding system (e.g., hopper) and soft distribution "recoater" blades that drag powder across the build surface. An EBM system, in contrast, uses a powder feeding system (e.g., hopper) and metal rake.

Grade 91 (Gr91) and Grade 92 (Gr92) Steel

Teachings of the present disclosure relate to AM of creep resistant ferritic steels (CRFSs). A CRFS is a steel configured to withstand a constant load at high temperatures. CRFSs are commonly used as components of steam power plants operating at elevated temperatures (e.g., boilers, turbines, and steam lines). Example CRFSs include Gr91 steel and Gr92 steel.

Gr91 steel is an alloy referred to as a modified 9% Cr alloy. Modified 9Cr-1Mo—V—Nb (Gr91) steel was developed in the late 1970s. Gr91 steel is a 2nd generation creep-resistant ferritic/martensitic (F/M) steel with 9% Cr, 1% Mo, and small additions of V and Nb to form fine carbo-nitrides. It is broadly used in fossil and nuclear power plants in both plate and piping forms for components operating at temperatures up to about 650° C. Gr91 is the current "workhorse" alloy in these applications and was approved for use under the American Society of Mechanical Engineers (ASME) Boiler and Pressure Vessel (B&PV) Code in 1983.

A pseudo-binary section of a phase diagram calculated for Gr91 steel is shown in FIG. 1. The phase diagram indicates the equilibrium phases as a function of temperature and composition, in this case as a function of C content. The dashed line in FIG. 1 corresponds to 0.09% C, the composition for the powder used in the following description. FIG. 1 also designates the sequence of equilibrium phases present during cooling from the liquid phase ($L>\delta>\gamma>\alpha$, including two types of carbides).

Gr92 steel is considered to be a modified version of Gr91 steel. Gr92 steel has a nominal chemical composition of Fe-9Cr-0.5Mo-1.8W—VNb.

Materials

Gr91 steel powder (or another CRFS steel powder) may be obtained from a commercial source, such as Carpenter Powder Products (Bridgeville, Pa.). Gr91 steel powder may be produced using atomization in nitrogen. The composition of the Gr91 steel powder used to perform the experiments described herein, as well as the specifications for Gr91 steel, are shown in Table 1 below. The Gr91 steel powder complied with the specification for Gr91 steel except for a slightly higher nickel (Ni) content.

TABLE 1

Composition of Gr91 steel power used and composition of Gr91 steel dictated by pertinent specifications (ASTM A213 & A335).

|    | Grade 91 Composition Specification (wt. %)* | Grade 91 Composition Powder Alloy (wt. %) |
|----|---------------------------------------------|-------------------------------------------|
| C  | 0.08-0.12                                   | 0.09                                      |
| Mn | 0.30-0.60                                   | 0.47                                      |
| P  | 0.020                                       | 0.003                                     |
| S  | 0.010                                       | 0.007                                     |
| Si | 0.20-0.50                                   | 0.41                                      |
| Cr | 8.00-9.50                                   | 9.01                                      |
| Mo | 0.85-1.05                                   | 0.93                                      |
| Ni | 0.040                                       | 0.06                                      |
| V  | 0.18-0.25                                   | 0.18                                      |
| Nb | 0.06-0.10                                   | 0.07                                      |
| B  | —                                           | <0.001                                    |
| N  | 0.03-0.07                                   | 0.03                                      |
| Al | 0.040                                       | 0.02                                      |
| Ti | —                                           | <0.01                                     |
| W  | —                                           | —                                         |
| Zr | —                                           | <0.01                                     |
| Fe | Rem                                         | Rem                                       |

Figure 2:
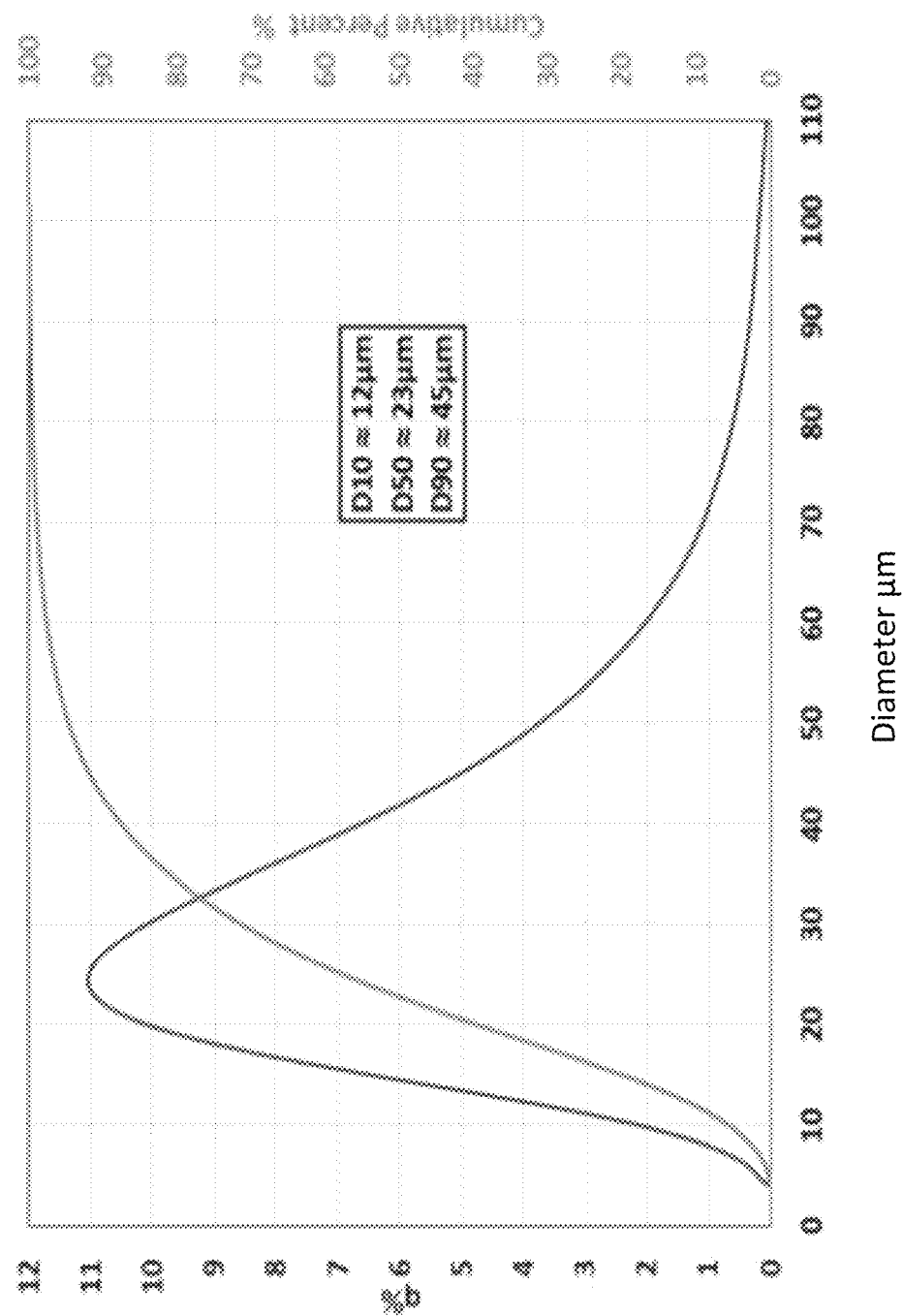
FIG. 2 illustrates powder size distribution data for Gr91 steel powder according to embodiments of the present disclosure.

The powder size distribution of the Gr91 steel powder was characterized using laser scattering analysis with a Horiba analyzer. Information on the powder size distribution is provided in FIG. 2. The q % in FIG. 2 represents the volume percent determined for each diameter range. The powder diameters ranged from about 5 μm to over 100 μm, with 90% of the powder being less than about 45 µm. The values for D10, D50, and D90 by volume are shown in FIG. 2.

AM Processing

Figure 3:
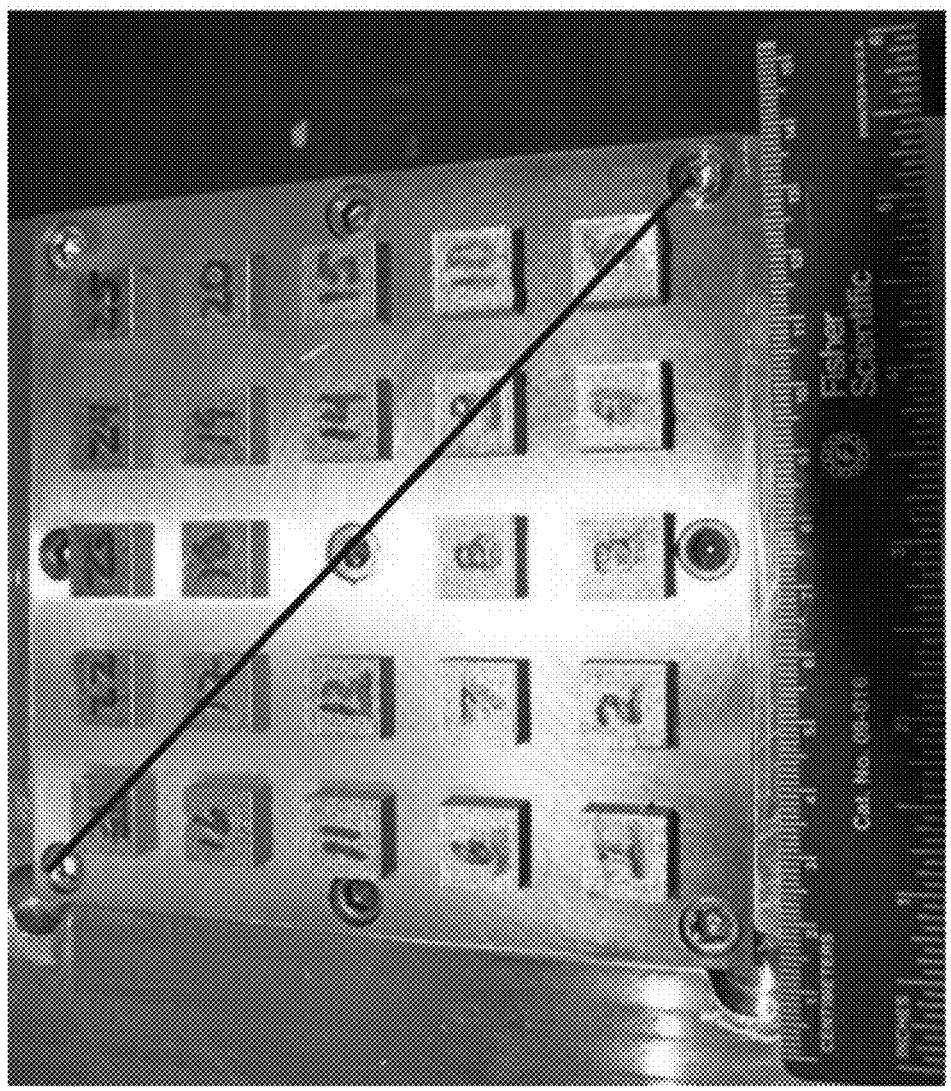
FIG. 3 illustrates block samples on a build plate insert according to embodiments of the present disclosure.

AM processing of the foregoing Gr91 steel powder was undertaken using an EOS 280 machine with a mild steel insert built into a steel build plate. No standard build parameters were available for Gr91 steel. Consequently, the heat input for Gr91 was estimated by multiplying the heat input recommended for 17-4 PH stainless steel by the ratio of the enthalpy required to heat and melt the alloys ([∫Cp dT+ΔHf]Gr91/ [∫Cp dT+ΔHf]17-4). This value (68.1 J/mm$^3$) was then used as the center point for a 5×5 matrix where beam power and beam traverse rate were both varied in combinations of greater than or equal to 10% to produce twenty-five 0.5"×0.5"×0.5" cubes. The physical layout of a 5×5 matrix of the blocks is shown in FIG. 3.

Various beam powers may be used. In at least some examples, beam powers from about 221 W to about 270 W may be used.

Various traverse rates may be used. In at least some examples, traverse rates from about 675 mm/s to about 825 mm/s may be used.

Various heat inputs may be produced. In at least some examples, when a beam power from about 221 W to about 270 W is used, and a traverse rate from about 675 mm/s to about 825 mm/s is used, heat inputs ranging from about 55.7 J/mm$^3$ to about 83.2 J/mm$^3$ may be produced. One skilled in the art will appreciate that other heat inputs may be used. The parameters for each of the twenty-five cubes are listed in Table 2 below. The blocks were built in a layer-by-layer fashion normal to the z direction typical of AM processes.

TABLE 2

Matrix of build parameters for Gr91 steel.

| Grade 91 Settings | | | |
|---|---|---|---|
| Layer Thickness | Speed | Power | Hatch distance |
| 40 um Nominal | 750 | 245 | 0.12 |

| | Speed | | Power | | Volume Energy Density |
|---|---|---|---|---|---|
| Cube # | % Nominal | mm/s | % Nominal | Watts | Joules/mm^3 |
| 1 | 10 | 825 | −10 | 221 | 55.7 |
| 2 | 5 | 788 | −10 | 221 | 58.3 |
| 3 | 0 | 750 | −10 | 221 | 61.3 |
| 4 | −5 | 713 | −10 | 221 | 64.5 |
| 5 | −10 | 675 | −10 | 221 | 68.1 |
| 6 | 10 | 825 | −5 | 233 | 58.8 |
| 7 | 5 | 788 | −5 | 233 | 61.6 |
| 8 | 0 | 750 | −5 | 233 | 64.7 |
| 9 | −5 | 713 | −5 | 233 | 68.1 |
| 10 | −10 | 675 | −5 | 233 | 71.8 |
| 11 | 10 | 825 | 0 | 245 | 61.9 |
| 12 | 5 | 788 | 0 | 245 | 64.8 |
| 13 | 0 | 750 | 0 | 245 | 68.1 |
| 14 | −5 | 713 | 0 | 245 | 71.6 |
| 15 | −10 | 675 | 0 | 245 | 75.6 |
| 16 | 10 | 825 | 5 | 257 | 65.0 |
| 17 | 5 | 788 | 5 | 257 | 68.1 |
| 18 | 0 | 750 | 5 | 257 | 71.5 |
| 19 | −5 | 713 | 5 | 257 | 75.2 |
| 20 | −10 | 675 | 5 | 257 | 79.4 |
| 21 | 10 | 825 | 10 | 270 | 68.1 |
| 22 | 5 | 788 | 10 | 270 | 71.3 |
| 23 | 0 | 750 | 10 | 270 | 74.9 |
| 24 | −5 | 713 | 10 | 270 | 78.8 |
| 25 | −10 | 675 | 10 | 270 | 83.2 |

The direction of deposition for the parallel passes that comprised each layer may be rotated. Various degrees of rotation between adjacent parallel passes may be used. For example, adjacent parallel passes may be rotated at least 1°, at least 2°, at least 5°, at least 10°, at least 15°, at least 20°, at least 25°, at least 30°, at least 35°, at least 40°, at least 45°, at least 50°, at least 55°, at least 60°, at least 65°, at least 70°, or more. In at least some examples, adjacent parallel passes may be rotated by about 67°.

Heat inputs along diagonals of the 5×5 matrix, such as the one shown by the line in FIG. 3 extending from the top left block to the bottom right block, were all nominally identical. After processing, the blocks were removed from the build plate using electrical discharge machining (EDM) wire, although other discharge techniques may be used. Each block was metallographically prepared, polished, etched, and inspected at magnifications up to 1000× using an optical microscope to determine whether full density was achieved.

The present disclosure enables tailoring of the AM process to produce individual AM passes within each layer that transforms to Martensite on cooling. Moreover, an AM process of the present disclosure may enable adjacent passes in the same layer and passes in the layer(s) above to provide partial or complete tempering of the Martensite in-situ to the desired property level. With this approach, the AM component (the resulting structure produced from AM processing described herein) may not require any further processing, except for some finish machining. Moreover, the AM component may have the desired microstructure with proper levels of strength, creep resistance, and radiation resistance, while being manufactured more affordably than with other practices.

While not wishing to be bound by theory, production of steel, as described herein, may result in a cooling rate (e.g., >10$^5$ K/s) that largely precludes formation of traditional 100% martensitic structure. Such imparts unique and not previously obtainable microstructures (e.g., ferrite+carbides+small pockets of martensite) that in turn provide for enhanced high-temperature properties (e.g., at least for 1000 hours at 600° C.) that exceed those of more expensive Ni alloys.

Characterization

Microstructures of the as deposited samples (i.e., samples produced from AM techniques described above) were characterized across several length scales using light optical microscopy (LOM), scanning electron microscopy (SEM), electron backscatter diffraction (EBSD), transmission electron microscopy/scanning transmission electron microscopy (TEM/STEM), and high-energy x-ray diffraction (XRD). Several etchants were used to reveal microstructures for the AM samples examined with LOM and SEM. The oxalic acid electro-etch (6V DC for about 20 seconds) was the most commonly used etchant. EBSD samples were typically vibratory polished and electro-polished.

Mechanical Testing

Bulk tensile tests were performed on a load frame, and at temperatures of 20° C., 300° C., and 600° C. Loading was conducted in the build direction. Additionally, mounted samples of wrought steel were tested using the Vickers microhardness technique with a load of 200 grams.

Results

Tensile Properties

Figure 4A:
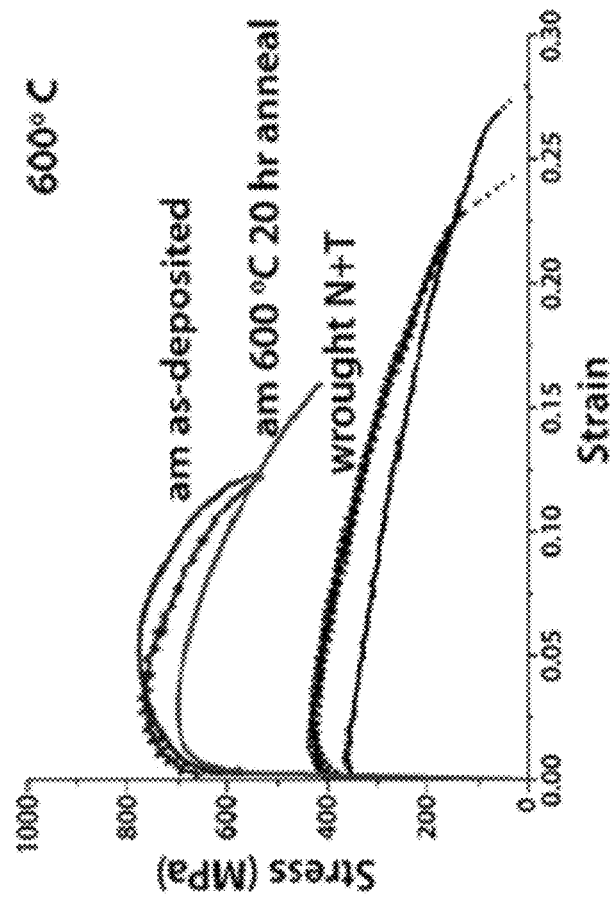
FIG. 4A illustrates stress/strain curves for additive manufactured Gr91 steel compared to commercially available wrought T91 normalized and tempered, at room temperature, according to embodiments of the present disclosure.
Figure 4B:
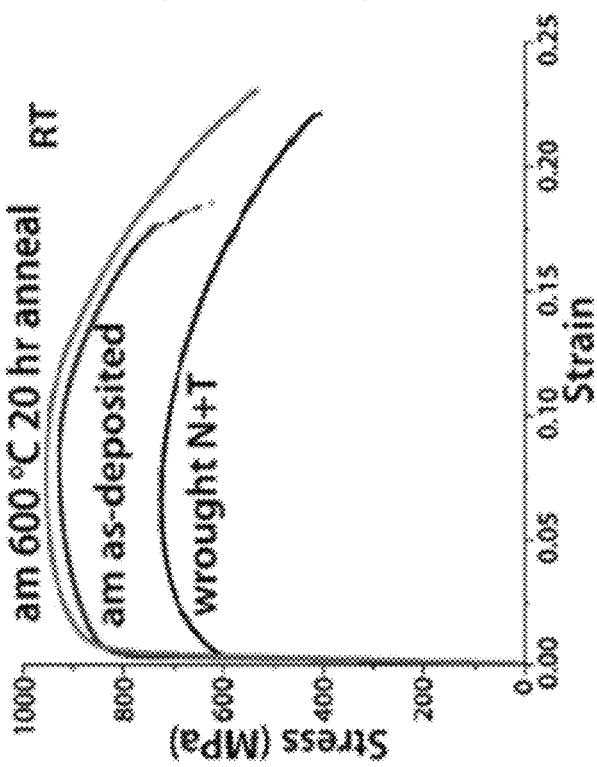
FIG. 4B illustrates stress/strain curves for additive manufactured Gr91 steel compared to commercially available wrought T91 normalized and tempered, at 600° C. according to embodiments of the present disclosure.

Two samples of each sample type were tested. Samples included AM as-deposited, AM annealed for 20 hours at 600° C., and wrought material with a normalization and tempering treatment. The AM annealed for 20 hours at 600° C. sample was for showing the stability of the material at elevated temperature. A summary of the results of tensile testing is provided in the stress/strain curves presented in FIGS. 4A and 4B. These stress/strain curves show the improved properties of the AM material, even after a 20 hour anneal at 600° C., compared to wrought material at RT and 600° C.

Yield strength at 0.2% strain measurements at each temperature (which is well beyond the elastic region) are presented in Table 3. At both room temperature and 600° C., the AM material both as-deposited and annealed exhibited significantly higher yield strength than the wrought normalized and tempered material.

TABLE 3

Highest 0.2% strain yield strength of each condition for each AM and wrought (N + T) material.

| | Room temperature | 600° C. |
| --- | --- | --- |
| Additively manufactured as-deposited | 835 MPa | 700 MPa |
| Additively manufactured annealed for 20 hours at 600° C. | 870 MPa | 680 MPa |
| Wrought Norm + Temp | 610 MPa | 410 MPa |

Ductility was observed to be higher for the AM as-deposited and AM annealed for 20 hours at 600° C. samples than for the wrought normalized and tempered samples at both room temperature and 600° C. test temperatures. The ductility is expressed as uniform elongation of the tensile samples. The results are shown in Table 4 and correspond to the data presented in FIGS. 4A and 4B.

TABLE 4

Highest ductility measured by uniform elongation strain for each AM and wrought (N + T) material.

| | Room temperature | 600° C. |
| --- | --- | --- |
| Additively manufactured as-deposited | 0.09 | 0.05 |
| Additively manufactured annealed for 20 hours at 600° C. | 0.08 | 0.03 |
| Wrought Norm + Temp | 0.07 | 0.02 |

AM Samples

Microstructural features of AM Gr91 steel with enhanced high temperature mechanical properties are described below. Microstructure is known to impact mechanical properties.

AM ferritic/martensitic steels using powder-bed methods may result in hierarchal microstructures. The largest microstructural features may correspond to the raster pass made by the heat input method (electron beam, laser, etc.). These features may be columnar and may be on the order of 100 µm in diameter and extend the length of the build, however, depending on processing parameters could be different in size.

The columnar features from the heat input passes may be comprised of several distinct features including: i) featureless regions; ii) fine grained regions; and iii) martensitic regions. The fine grained and martensitic regions may be at the edge of the columnar features and could be a result of remelting and rapid solidification of material from a prior heat input pass. The featureless regions may include larger grains than the fine grained and martensitic regions, and may be in the central region of each heat input pass.

Detailed analysis with TEM microscopy revealed the finest details of the microstructures. In the featureless regions of the columnar features, the microstructure included a uniform and high density of lattice dislocations, also a uniform distribution of plate-like features around 500 nm in length and several nm in thickness. The fine-grained regions were similar to the featureless regions, except the grain size was an order of magnitude smaller. The martensitic regions were comprised of the martensite phase.

Prototype

Figure 5:
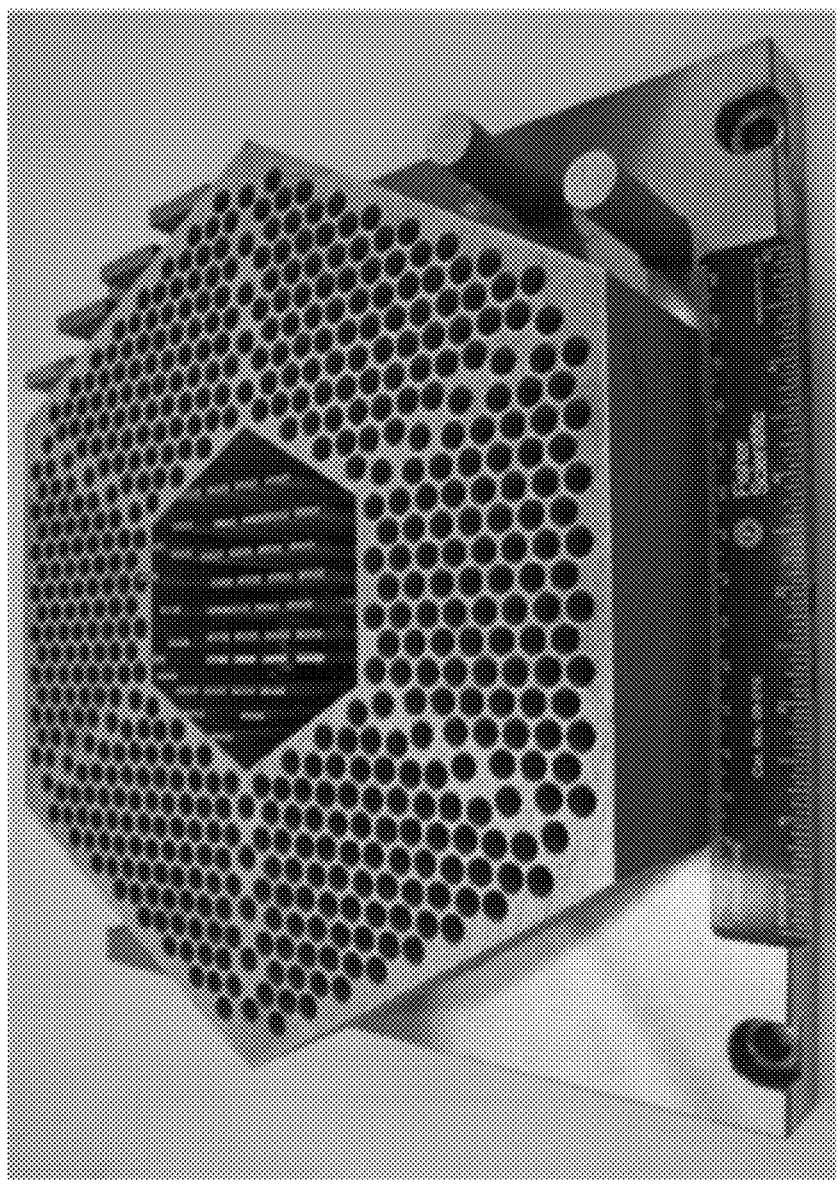
FIG. 5 is a subscale prototype according to embodiments of the present disclosure.

A photograph of a prototype hexagon produced according to the above is shown in FIG. 5. The partly built tensile samples can be seen in the center of the hexagon. The four blocks seen at the back right corner were used to produce the tensile samples.

Overview of Terms and Abbreviations

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting, unless otherwise indicated. Other features of the disclosure are apparent from the foregoing detailed description and the claims.

Unless otherwise indicated, all numbers expressing quantities of components, molecular weights, percentages, temperatures, times, and so forth, as used in the specification or claims, are to be understood as being modified by the term "about." Accordingly, unless otherwise indicated, implicitly or explicitly, the numerical parameters set forth are approximations that can depend on the desired properties sought and/or limits of detection under standard test conditions/methods.

While the present disclosure has been particularly described in conjunction with specific embodiments, it is evident that many alternatives, modifications, and variations will be apparent to those skilled in the art in light of the foregoing description. It is therefore contemplated that the appended claims will embrace any such alternatives, modifications, and variations as falling within the true spirit and scope of the present disclosure.

What is claimed is:

1. A creep resistant ferritic and martensitic steel produced from powder bed fusion (PBF) additive manufacturing (AM) of steel powder, comprising:
   improved ductility as compared to a wrought steel;
   wherein the creep resistant ferritic and martensitic steel is produced from PBF AM of Grade 91 steel powder; and
   wherein when the creep resistant ferritic and martensitic steel is annealed for about 20 hours at 600° C., the annealed creep resistant ferritic and martensitic steel has a strain yield strength of 870 MPa at room temperature.

2. The creep resistant ferritic and martensitic steel of claim 1, wherein the creep resistant ferritic and martensitic steel has a strain yield strength of 700 MPa at 600° C.

3. The creep resistant ferritic and martensitic steel of claim 1, wherein the creep resistant ferritic and martensitic steel has a ductility of 0.09 at room temperature.

4. The creep resistant ferritic and martensitic steel of claim 1, wherein the creep resistant ferritic and martensitic steel has a ductility of 0.05 at 600° C.

5. The creep resistant ferritic and martensitic steel of claim 1, wherein:
   the annealed creep resistant ferritic and martensitic steel has a ductility of 0.08 at room temperature.

6. The creep resistant ferritic and martensitic steel of claim 1, wherein:
   the annealed creep resistant ferritic and martensitic steel has a ductility of 0.03 at 600° C.

7. A creep resistant ferritic and martensitic steel produced from powder bed fusion (PBF) additive manufacturing (AM) of steel powder, comprising:
   improved ductility as compared to a wrought steel;
   wherein the creep resistant ferritic and martensitic steel is produced from PBF AM of Grade 91 steel powder; and
   wherein when the creep resistant ferritic and martensitic steel is annealed for about 20 hours at 600° C., the annealed creep resistant ferritic and martensitic steel has a strain yield strength of 680 MPa at room temperature.

8. A creep resistant ferritic and martensitic steel produced from powder bed fusion (PBF) additive manufacturing (AM) of steel powder, comprising:
   improved ductility as compared to a wrought steel;
   wherein the creep resistant ferritic and martensitic steel is produced from PBF AM of Grade 91 steel powder; and
   wherein when the creep resistant ferritic and martensitic steel is annealed for about 20 hours at 600° C., the annealed creep resistant ferritic and martensitic steel has a strain yield strength of 835 MPa at room temperature.

9. A method of producing the creep resistant ferritic and martensitic steel according to claim 1, the method comprising:
   obtaining a Grade 91 steel powder; and
   performing a powder bed fusion (PBF) additive manufacturing (AM) using the Grade 91 steel powder.

10. The method of claim 9, wherein the performing comprises using a beam power between about 221 W and about 270 W.

11. The method of claim 9, wherein the performing comprises using a traverse rate between about 675 mm/s and about 825 mm/s.

12. The method of claim 9, wherein the performing comprises producing a heat input between about 55.7 $J/mm^3$ and about 83.2 $J/mm^3$.

13. The method of claim 9, wherein the performing comprises a heat input value of about 68.1 $J/mm^3$.

14. The method of claim 9, wherein the performing comprises rotating a direction of deposition.

15. The method of claim 14, wherein directions of deposition of adjacent layers of the steel powder are rotated about 67°.

* * * * *